United States Patent Office 3,412,041
Patented Nov. 19, 1968

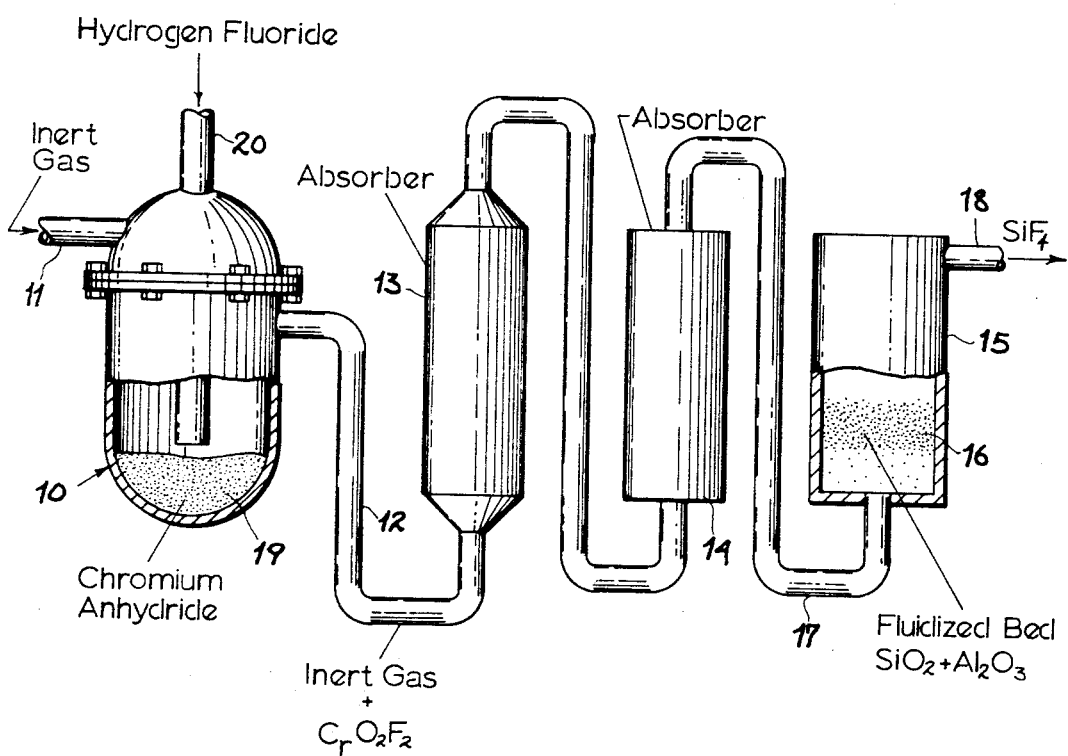

3,412,041
PROCESS FOR PRODUCING CATALYST COMPOSITIONS AND THE PRODUCT OF THIS PROCESS
Pietro Saccardo, Gianni Trada, Vittorio Fattore, and Jean Herzenberg, Milan, Italy, assignors to Montecatini Edison S.p.A., Milan, Italy, a corporation of Italy
Filed July 1, 1964, Ser. No. 379,608
Claims priority, application Italy, July 3, 1963, 13,838/63
7 Claims. (Cl. 252—455)

ABSTRACT OF THE DISCLOSURE

A process for producing a single-component catalyst system for the polymerization of α-olefins, comprising the step of: contacting a silicon containing solid support with a chromium oxyfluoride for a period of time and at a temperature sufficient to effect a reaction between said support and said chromium oxyfluoride to form at least on exposed portions of said support a chromium oxide containing catalyzing surface unitarily with the support.

---

Our present invention relates to catalyst systems of the type wherein at least one metal compound, usually a metal oxide, is deposited on a carrier having a large surface area and, more particularly, to an improved method of producing a catalyst composition of this general type but with unique characteristics described hereinbelow, as well to the composition resulting from such process.

It is a common practice in the art of catalyst preparations to deposit metals and metal oxides upon carriers having large effective surface areas and generally comprising siliceous materials. Siliceous carriers of this type usually contain silica or silicates and mixtures of silica and silicates with other materials such as alumina. Silica-aluminas, for example, are commercially available and can be formed by sintering together a silicate or silica and alumina and thereafter treating the sintered product in such manner as to increase its effective surface area. Such carriers are also formed by precipitation from solution, etc. Most of the prior-art techniques in the preparation of catalyst systems of the above type generally involve the impregnation of the carrier with solutions (usually aqueous) of metal oxides or metal salts readily convertible to oxides by heating. Such solvent may then be removed by evaporation, whereupon the carrier is heated to convert the metal salt to the corresponding oxides. This method of deposition leads to a distribution of oxides on the exposed or effective surfaces of the carrier which is only statistically uniform or homogeneous. It is a well-known disadvantage of these systems that, in actuality, excess oxide accumulation takes place while in other regeions of the effective catalyst surface, the oxide coating is lacking. It has long been sought in this field to provide a catalyst system whose distribution of oxides along the effective catalyst surface is uniform and homogeneous in an absolute sense, i.e. a carrier having a homogeneous layer of the oxide deposited upon substantially the entire surface area of the carrier at a uniform thickness and preferably of molecular thickness. It is a common difficulty with solution impregnation systems, achieving deposition from a liquid vehicle by heating, that the formation of substantially monomolecular layers cannot be attained and the catalyst systems are seldom reproducible. Still another difficulty with these systems derives from the fact that they usually require prolonged heating of the impregnated catalyst mass, such heating being necessary in order to both evaporate the solvent and convert the metal compound to the corresponding oxide. During such heating, the metal compound may undergo undesirable transformations reducing the effectiveness of it as a catalyst or reaction promotor, while the carrier itself may undergo structural modification which may alter its surface area or otherwise change the catalytic properties.

To avoid some of these drawbacks it has been proposed to prepare a catalyst system by grinding together the metal compound and the carrier mixture. This technique may eliminate difficulties arising from the use of water as a medium in the impregnation of the carrier, but cannot insure a uniform distribution of the oxide on the carrier surface.

It is, therefore, the principal object of the present invention to provide a process for producing a catalyst composition wherein a reaction-promoting metal compound is substantially homogeneously distributed upon the surface of a carrier.

Another object of this invention is to provide an improved catalyst composition of the character described.

Still another object of this invention is to provide an improved method of forming a catalyst system bearing a chromium oxide uniformly deposited upon a siliceous carrier, preferably containing silica.

These objects and others which will become apparent hereinafter, are attained, in accordance with the present invention, by providing a process for producing a catalyst composition consisting essentially of at least one metal compound and preferably a chromium compound such as a chromium oxide, deposited on a siliceous carrier, the process comprising the step of contacting the carrier with a fluorine-containing compound of the metal capable of reaction with the siliceous material of the carrier to evolve volatile silicon fluorine while depositing the metal compound on the surface of the carrier from which the silicon of the silicon fluoride was derived. In other words, the metal compound is originally in an active form and reacts with the carrier to form a volatile compound of a substance (e.g. silicon) of the carrier whose evolution resulted in the position of the reaction promoter.

This process comprises, therefore, the reaction of a fluorinated compound of a metal together with solid substances containing silicon oxide in such manner as to yield a solid composition bearing on its surface molecules containing the metal and volatile silicon tetrafluoride readily removed from the surface. It will thus be appreciated that the reaction renews the effective surface of the catalyst so that the oxides are deposited onto these newly-formed surfaces, giving rise to particularly effective active centers.

According to a theory of the invention, not restrictive of the scope therof, a homogeneous layer of the metal oxide is formed on the surface of the silicon dioxide or siliceous materials and acts as a barrier to further reaction of the fluorinated compound with silicon. Thus the reaction terminates locally after formation of the oxide which appears to be in a monomolecular layer.

The principles described above have been found to be most readily applicable to the formation of chromium-containing catalysts and, more effectively, those wherein a chromium oxide (e.g. chromium trioxide) is deposited uniformly on the effective surfaces of a silica-containing carrier. The reactive compound in this case can be an oxifluoride of the metal, i.e. chromyl fluoride ($CrO_2F_2$), which reacts with silica in gas or liquid phase according to the relationship:

$$2CrO_2F_2 + SiO_2 \rightarrow SiF_4\uparrow + 2CrO_3$$

This reaction, which can take place in the gaseous phase with particularly good and intimate contact between the gaseous chromyl fluoride and the solid carrier containing silicon dioxide, occurs at relative low temperatures (note that the silicon tetrafluoride is in a gaseous state at temperatures as low as −65° C.) and can be effected at temperatures close to ambient or room temperature. Another advantage resides in the fact that the chromium is deposited upon the newly formed surfaces in the form of chromium trioxide so that no subsequent extreme thermal treatment is required of the formed catalyst system. Some elevation in temperature, well below the temperatures at which metal salts (such as chromium nitrates) decompose to the oxides, may be desirable to drive off any residual silicon tetrafluoride.

As indicated above, it is also possible to carry out the reaction in liquid phase using a liquid medium in which the chromyl fluoride is at least limitedly soluble. Suitable solvents for this purpose are fluorinated hydrocarbons and nitrobenzene, the fluorinated hydrocarbons being of the Freon type (e.g. fluorochloroethanes), fluoroform and carbon tetrafluoride. The best fluoro-chloroethane for the present purpose has been found to be 1,1,2-trifluoro-1,2,2-trichloroethane. It should be noted that there is no material difference whether the oxyfluoride compound reacts directly with silicon dioxide or with a silica hydrate (silicon hydroxide) having hydroxyl groups. It may be noted that catalyst carriers of the silica, silica-alumina and silicate types most generally always contain such hydroxyl groups.

Studies of the quantity of chromyl fluoride absorbed by the catalyst carrier have indicated that the reaction occurs until there is a substantially complete coating of the entire effective surface area of the carrier. Calculations show that this layer is substantially a molecular thickness of chromium trioxide. The catalysts prepared by the process of the present invention may be obtained with the desired metal content in a highly reproducible manner, merely by controlling the amount of chromium fluoride reacting with the carrier, up to the maximum determined by the surface area thereof. The catalysts have been found to have greater regularity in respect to their thermal characteristics as is ascertainable by magneto-chemical and analytical measurements. This regularity of behavior with regard to thermal treatments is particularly useful when specific ratios of valence levels of the metal in the deposited compounds and/or particular interactions of the deposited metal compounds with the carrier are desired to be effected by way of subsequent thermal treatments.

The catalyst systems prepared as described above have proved to be highly useful in dehydrogenation, hydrodealkylation, polymerization of unsaturated hydrocarbons, etc. The catalytic activity of the present composition exceeds that of chromium oxide catalysts used for the above purposes and represents a marked improvement thereover. The catalyst systems, according to the present invention, having the greatest catalytic activity are those having a metal content of between substantially 0.1 and 25% by weight and preferably 0.1 and 11% by weight chromium.

The above and other objects, features and advantages of the present invention will be more readily apparent from the following examples and description, reference being made to the accompanying drawing in which the sole figure is a flow-diagram of an apparatus for producing the catalyst composition of the present invention.

Example 1

The equipment was constituted of a first reactor 10 provided with gas inlet and outlet pipes 11 and 12, the latter being connected with two purification columns 13, 14, arranged in series and, downstream of said columns, with a second reactor adapted to receive a fluidized bed 16 and provided with a gas-inlet pipe 17 and a vent pipe 18.

In the first reactor 10, 4 g. of pure chromic anhydride 19 were placed, in both intermediate columns 13, 14 the dehydrating and purifying agents for chromyl fluoride were disposed, and in the second reactor 15, 30 g. silica-alumina 16 (of Davison Co.), containing 75% silica and 25% alumina, were placed. An inert-gas stream (e.g. of nitrogen) sufficient to make the silica-alumina bed 16 fluid was conveyed through the whole equipment from inlet 11.

Simultaneously with the inert-gas stream, a hydrogen-fluoride stream was admitted to the first reactor through pipe 20 at the throughput of 40 ml./minute for a time sufficient to convert all of the chromic anhydride to chromyl fluoride.

The gaseous mixture of chromyl fluoride and inert gas leaving the first reactor via outlet 12 passed to adsorption columns 13, 14 where it was freed from impurities and passed finally to the second reactor 15 wehre it was intimately contacted with therein contained silica-alumina. After consumption of all the chromic anhydride in the first reactor, the hydrogen-fluoride flow was terminated. After this treatment, the silica-alumina was found to contain 2.89% chromium in the form of homogeneously distributed chromium trioxide.

Example II

The equipment consisted of a first reactor containing chromyl fluoride and cooled at 0° C., connected with a second reactor adapted to operate according to the fluid-bed technique and containing silica-alumina (Davison Co.) with 87% silica and 13% alumina. The temperature of the second reactor was brought, by means of a suitable heating system, to 150° C.

A dry-air stream was introduced into the first reactor so as to cause chromyl fluoride partial evaporation, the chromyl fluoride passing then to the second reactor where it was permitted to react with silica-alumina. The air stream was maintained until appearance at the second-reactor outlet 18 of copious dark-red vapors of chromyl fluoride. This showed that the reaction between silica-alumina and chromyl fluoride was practically completed. After this treatment, the silica-alumina proved to contain 3.4% chromium by weight; the chromium trioxide content corresponded to a monomolecular layer covering substantially the entire predetermined surface area of the carrier.

Example III

Into 150 ml. of a 2.23% by weight solution of chromyl fluoride in 1,1,2-trifluoro-trichloroethane, 50 g. of commercial silica-alumina (of the Ketjen Co.) containing 87% silica and 13% alumina by weight were introduced. The whole was stirred at room temperature for one hour; then the solvent was removed by heating. A catalyst was obtained which contained 1.11% chromium by weight with respect to the silica-alumina.

Example IV

While operating as in Example I, but introducing into the second reactor 150 ml. of silica, instead of silica-alumina, a catalyst was obtained which contained 1.20% by weight of chromium.

Example V

While operating as in Example I, but introducing into the second reactor 20 g. of bentonite instead of silica-alumina, a catalyst was obtained which contained 1.25% by weight of chromium.

Example VI

The same equipment as described in Example I was employed; the first reactor contained 10 g. of pure chromic anhydride and the second reactor contained 50 g. of commercial silica-alumina (Ketjen Co.) containing 87% by weight of silica and 13% by weight of alumina. While operating as in Example I for 2 hours, a catalyst was obtained containing 4.33% by weight of chromium and 0.45% by weight of fluorine.

Example VII

In the same equipment as described in Example I, in which the two purification columns of chromyl fluoride were cut off, 5 g. of pure chromic anhydride were treated with a stream of HF and $N_2$. The gas coming from the first reactor was directly conveyed to the second reactor containing 50 g. of silica-alumina (of Ketjen Co.) containing 87% by weight of silica and 13% by weight of alumina. After 1 hour, a catalyst was obtained containing 2.93% by weight of chromium and 15% by weight fluorine.

We claim:

1. A process for producing a single-component catalyst system effective as an exclusive catalyst for the polymerization of α-olefins by contact of said α-olefins with catalyzing surfaces of said system, comprising the step of contacting a silicon-containing solid support with a chromium oxyfluoride for a period of time in the absence of any other reactive species and at a temperature to effect reaction between said chromium oxyfluoride and at least portions of the support exposed thereto and form chromium oxide containing catalyzing surfaces at said portions unitary with the support.

2. The process defined in claim 1 wherein said chromium oxyfluoride is chromylfluoride.

3. The process defined in claim 1 wherein the silicon-containing support is a silica-containing carrier.

4. The process defined in claim 3 wherein said carrier consists essentially of a silica-alumina.

5. The process defined in claim 1 wherein said chromium oxyfluoride is a gas at said temperature and contacts said silicon-containing support in gaseous phase.

6. The process defined in claim 1 wherein the reaction time is at least sufficient to ensure the presence of substantially 0.1 to 11% by weight chromium in the catalyst system.

7. A catalyst system produced by the process of claim 1 and consisting essentially of the reaction product of the treatment of a silicon-containing solid support and a chromium oxyfluoride and having chromium-oxide containing catalyzing surfaces, the catalyst system containing substantially 0.1 to 11% by weight chromium.

References Cited

UNITED STATES PATENTS

| | | | |
|---|---|---|---|
| 3,322,691 | 5/1967 | Craven | 252—458 |
| 3,346,511 | 10/1967 | Hill | 252—455 |
| 2,684,284 | 7/1954 | Grosse | 23—88 X |
| 3,166,544 | 1/1965 | Orzechowski | 252—429 X |

OTHER REFERENCES

Oliveri-Gazz. Chim (Italy) 16, p. 221 (1886).

Pascal (Edit)-Nouveau Traite de Chim, Min., vol. XIV, p. 151 (1959).

DANIEL E. WYMAN, *Primary Examiner.*

C. F. DEES, *Assistant Examiner.*